(12) United States Patent
Nakagawa et al.

(10) Patent No.: US 7,264,073 B2
(45) Date of Patent: Sep. 4, 2007

(54) BATTERY MOUNTING STRUCTURE FOR AN ELECTRIC VEHICLE, AND VEHICLE INCORPORATING SAME

(75) Inventors: Mitsuo Nakagawa, Saitama (JP); Takashi Ozeki, Saitama (JP); Kyoichi Ariga, Saitama (JP); Kyosuke Kitayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/121,766

(22) Filed: May 4, 2005

(65) Prior Publication Data

US 2005/0257974 A1 Nov. 24, 2005

(30) Foreign Application Priority Data

May 18, 2004 (JP) ............................. 2004-147747
Aug. 6, 2004 (JP) ............................. 2004-231515

(51) Int. Cl.
*B60R 16/04* (2006.01)
(52) U.S. Cl. .................. 180/68.5; 180/68.2; 180/65.1; 429/100
(58) Field of Classification Search ............... 180/68.5, 180/68.1, 68.2, 65.1, 65.2; 224/412, 413; 429/96, 97, 98, 99, 100, 8
See application file for complete search history.

(56) References Cited

U.S. PATENT DOCUMENTS

| | | | | |
|---|---|---|---|---|
| 4,519,473 A | * | 5/1985 | Ochiai et al. ............... | 180/229 |
| 4,557,345 A | * | 12/1985 | Hamane et al. ............. | 180/229 |
| 4,564,081 A | * | 1/1986 | Hamane et al. ............. | 180/229 |
| 4,658,925 A | | 4/1987 | Hirosawa et al. | |
| 4,709,774 A | * | 12/1987 | Saito et al. .................. | 180/229 |
| 4,911,494 A | * | 3/1990 | Imai et al. .................. | 296/78.1 |
| 4,964,484 A | | 10/1990 | Buell | |
| 5,244,036 A | * | 9/1993 | Michl .......................... | 165/300 |
| 2001/0046624 A1 | * | 11/2001 | Goto et al. .................... | 429/99 |

FOREIGN PATENT DOCUMENTS

| | | | |
|---|---|---|---|
| JP | 05-105142 | | 4/1993 |
| JP | 05105142 A | * | 4/1993 |

* cited by examiner

*Primary Examiner*—Christopher P. Ellis
*Assistant Examiner*—John Walters
(74) *Attorney, Agent, or Firm*—Carrier, Blackman & Associates, P.C.; William D. Blackman; Joseph P. Carrier

(57) ABSTRACT

A battery mounting structure is provided for an electric vehicle which is operated using a motor as a driving source in which running wind is effectively utilized for cooling the batteries, and the cooling efficiency of a battery unit is enhanced. The electric vehicle is provided with a body frame where a front frame member extends from a head pipe diagonally downward toward the rear of the vehicle body. The battery mounting structure is attached to the front frame member of the body frame so that the cooling face of the battery unit is directly exposed to running wind. The battery mounting structure includes cooling fins which confront the running wind, and is covered by a body cover having louvered air intakes and air exhausts. The louvers direct the running wind smoothly to the cooling fins and protect the battery mounting structure.

22 Claims, 13 Drawing Sheets

BATTERY MOUNTING STRUCTURE FOR AN ELECTRIC VEHICLE, AND VEHICLE INCORPORATING SAME

CROSS-REFERENCE TO RELATED APPLICATIONS

The present invention claims priority under 35 USC 119 based on Japanese patent application Nos. 2004-147747, filed on May 18, 2004, and 2004-231515, filed on Aug. 6, 2004. The subject matter of these priority documents is incorporated by reference herein.

BACKGROUND OF THE INVENTION

1. Field of the Invention

The present invention relates to battery mounting structure in an electric vehicle, the electric vehicle using a motor as a driving source.

2. Background of the Invention

Conventionally, an electric vehicle has a large battery for driving an electric motor. Due to the size of the battery, it is difficult to obtain an adequate location and structure for mounting the battery to the vehicle frame. However, in JP-A No. 105142/1993 a battery mounting structure and location is disclosed for a two-wheeled electric vehicle in which a front frame extends diagonally downward from a head pipe toward the rear of the body, and in which a battery is provided along the front frame.

In JP-A No. 105142/1993, a motorcycle is disclosed in which a front pipe extends diagonally downward from a head pipe toward the rear of the body. Components are arranged on the motorcycle frame so that the bottom of a battery box is fastened to a bracket welded to the front pipe by a bolt. The front of a battery, housed in the battery box, is covered with an inner fender. The rear of the battery is covered with a cover for closing an opening of a leg shield, and the battery is arranged in a closed space.

A motor for running an electric vehicle consumes a great amount of power, and the battery which supplies power to motor must have a correspondingly great calorific value. In addition, in JP-A No. 105142/1993, since the battery, attached to the front pipe via the bracket, is arranged in the closed space, heat is easily and quickly accumulated.

The invention is made in view of the above described problem, and the object of the invention is to provide the battery mounting structure for an electric vehicle in which the cooling efficiency of the battery is enhanced by efficiently utilizing wind generated as a result of the forward motion of the vehicle, referred to hereafter as "running wind".

SUMMARY OF THE INVENTION

To provide a battery mounting structure for an electric vehicle in which the cooling efficiency of the battery is enhanced, the battery mounting structure for an electric vehicle according to a first aspect of the invention is based upon an electric vehicle which is provided with a body frame where a front frame member extends diagonally backward from a head pipe toward the rear of the body, and which can be operated using an electric motor as a driving source. The first aspect of the invention is characterized in that a battery, for supplying power to the motor, is attached to the front frame member of the body frame in such configuration that a cooling face of the battery is directly exposed to and confronts the flow of the running wind during movement of the vehicle.

Since the battery is attached to the front frame member in which running wind is directed and concentrated, and the cooling face is configured so that it is directly exposed to and confronts the running wind, cooling efficiency of the battery is greatly enhanced.

According to a second aspect of the invention, which is based upon the battery mounting structure of the electric vehicle according the first aspect of the invention, cooling fins are provided on the cooling face of the battery.

The cooling efficiency of the battery is further enhanced by providing the cooling fins on the cooling face of the battery.

According to a third aspect of the invention, which is based upon the battery mounting structure of the electric vehicle according to the first or second aspects of the invention, plural battery groups are attached to the front frame member of the vehicle body frame, and are arranged about the circumference of the front frame member having an interval formed between each adjacent pair of batteries, where the interval is wider adjacent the lower part of the front frame member than adjacent the upper part of the front frame member.

Since the required battery capacity is secured by using plural batteries formed into battery groups, and since an interval between adjacent battery groups attached to the front frame member is wider near the lower part of the front frame member, footrest space is easily secured behind the battery mounting structure, at the lower part of the front frame member.

According to a fourth aspect of the invention, which is based upon the battery mounting structure of the electric vehicle according to any of the first through third aspects of the invention, the battery is arranged having a battery group on the left side and a battery group on the right side with respect to a vehicle centerline, with the front frame member of the vehicle body frame positioned between the battery groups, and with another battery group arranged along the front frame member.

Since the battery capacity is secured by the use of plural batteries, and since respective battery groups are arranged on the left and on the right with the front frame member between them, and another battery is arranged along the front frame member, the efficiency of space for arranging the batteries is enhanced. Additionally, an interval between each battery can be suitably maintained, and the effect of heat between the batteries is thus reduced.

According to a fifth aspect of the invention, which is based upon the battery mounting structure of the electric vehicle according to any of the first through fourth aspects of the invention, the battery is covered from the front of the vehicle body with a front cover, and from the rear of the vehicle body with a rear cover. A cooling wind intake is formed in a front wall of the front cover, that is, on a portion of the front cover that faces the front of the vehicle body.

Since the battery is covered with the front cover and the rear cover, the battery is protected from splashes of mud and stone during operation, and thus durability is enhanced. Since the cooling wind intake is formed on the front wall of the front cover that faces the front of the vehicle body, running wind is easily taken in, and directly impacts on the battery. Thus the cooling efficiency of the battery is enhanced. In addition, the appearance of the vehicle is enhanced by covering the battery with the front cover and the rear cover.

According to a sixth aspect of the invention, which is based upon the battery mounting structure of the electric vehicle according to the fifth aspect of the invention, a louver is provided on the cooling wind intake.

The louver can substantially prevent a stone, mud and other objects and materials from invading through the cooling wind intake. By providing the louver within the cooling wind intake, even if a stone and others pass through the cooling wind intake, they pass through after interference with the louver, and thus are prevented from directly hitting the battery.

According to a seventh aspect of the invention, which is based upon the battery mounting structure of the electric vehicle according to the fifth or sixth aspects of the invention, a cooling wind exhaust port is formed on the rear cover.

Since the cooling wind exhaust port is formed on the rear cover, cooling wind taken from the cooling wind intake of the front cover can form a smooth flow of the cooling wind over the batteries to the cooling wind exhaust port. As a result, air resistance is reduced, and specific fuel consumption is correspondingly reduced.

According to an eighth aspect of the invention, which is based upon the battery mounting structure of the electric vehicle according to the seventh aspect of the invention, the cooling wind exhaust port is formed on the side wall of the rear cover at a location where it is overlapped by the side wall of the front cover. In this arrangement, the sidewall of the rear cover and the cooling wind exhaust port lie behind the front cover when they are viewed from the side of the vehicle.

Since the cooling wind exhaust port, formed on the side wall of the rear cover, has a structure in which the side wall of the front cover covers the outside thereof, the risk of invasion of a stone, mud and other objects entering through the cooling wind exhaust port is significantly reduced. Since the cooling wind exhaust port is covered with the side wall of the front cover, it is invisible from the outside, and the appearance of the vehicle is enhanced.

According to a ninth aspect of the invention, which is based upon the battery mounting structure of the electric vehicle according to the seventh or eighth aspects of the invention, a louver is provided on the cooling wind exhaust port.

Since the louver is provided on the cooling wind exhaust port, the invasion of a stone, mud and other objects through the cooling wind exhaust port is made even more difficult.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE INVENTION

Figure 1:
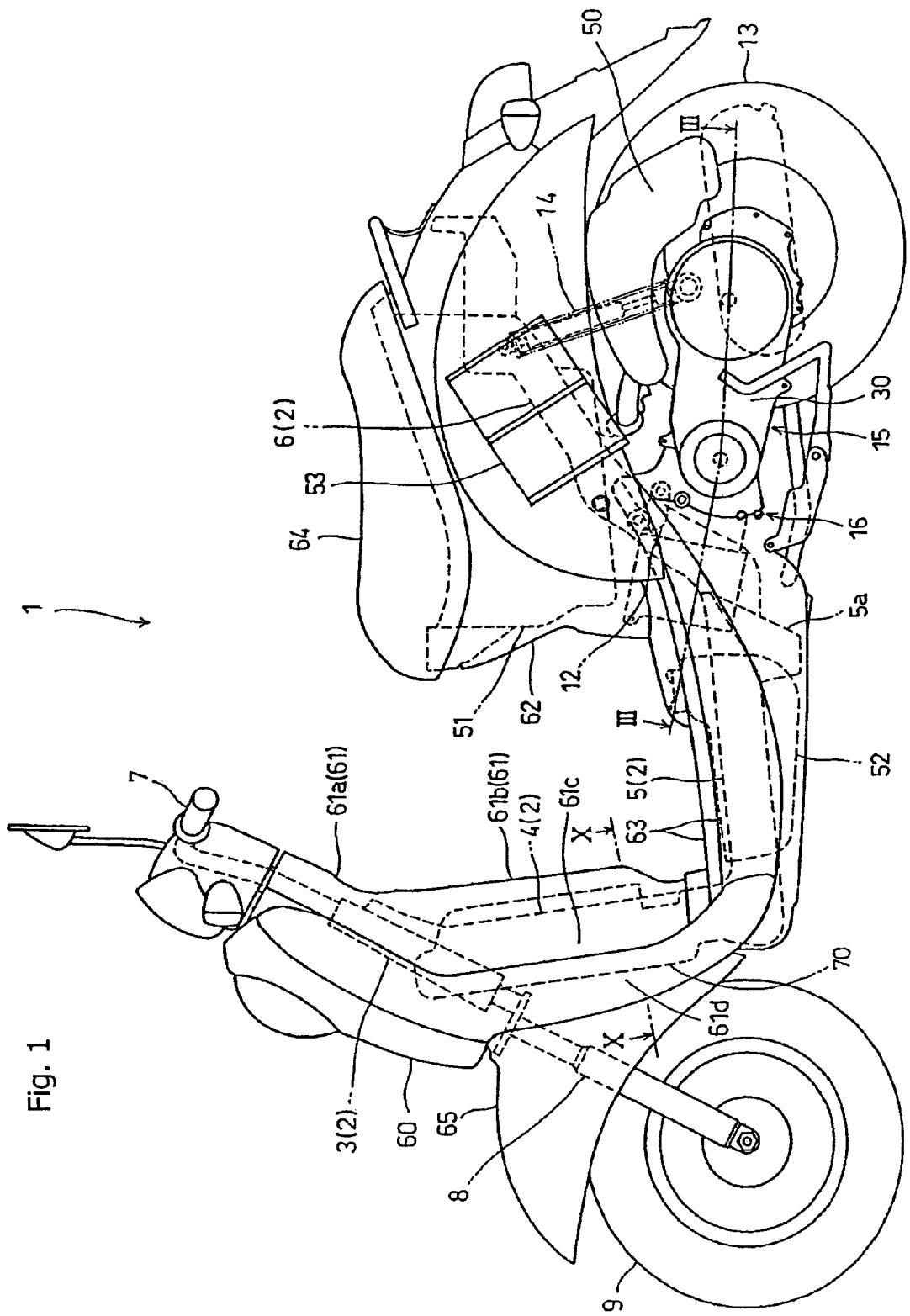
FIG. 1 is a side plan view showing a hybrid scooter-type electric motorcycle which incorporates a first embodiment of the battery mounting structure of the present invention.

Referring to FIGS. 1 to 11, a first illustrative embodiment of the invention will be described below.

An electric vehicle, incorporating a battery mounting structure according to the first embodiment, is a hybrid scooter-type electric motorcycle 1 which includes both an internal combustion engine 16 and an electric drive motor 40. However, the inventive battery mounting structure is not limited to use on a hybrid electric motorcycle, and is applicable to any electric vehicle, hybrid or otherwise, having a body frame structure similar to that of the illustrated embodiment.

A body frame 2 of the scooter-type electric motorcycle 1 includes a head pipe 3 and a front frame member 4 which extends backward and diagonally downward from the head pipe 3. A pair of intermediate frame members 5 are curved backward after they are branched laterally from the lower end of the front frame member 4. The intermediate frame members 5 extend substantially horizontally from the lower end of the front frame member 4. A pair of right and left rear frame members 6 are coupled by a cross member 5a of the intermediate frame members 5. The front end of each of the right and left rear frame members 6 is coupled to each rear end of the intermediate frame members 5, and extend backward and diagonally upwardly therefrom.

A handlebar 7 is pivotally supported by the head pipe 3 so that the handlebar can be turned. A front fork 8 extends integrally with the handlebar 7 below the head pipe 3, and a front wheel 9 is supported by the lower end of the front fork 8.

In the meantime, a power unit 15 is located in a longitudinally central position of the rear frame 6. The front upper part of the power unit 15 is supported by a link mechanism 12 via a bracket so that the rear portion of the vehicle can be vertically rocked. A rear shock absorber 14 is inserted between the rear of the power unit 15 and the rear of the rear frame 6.

Figure 3:
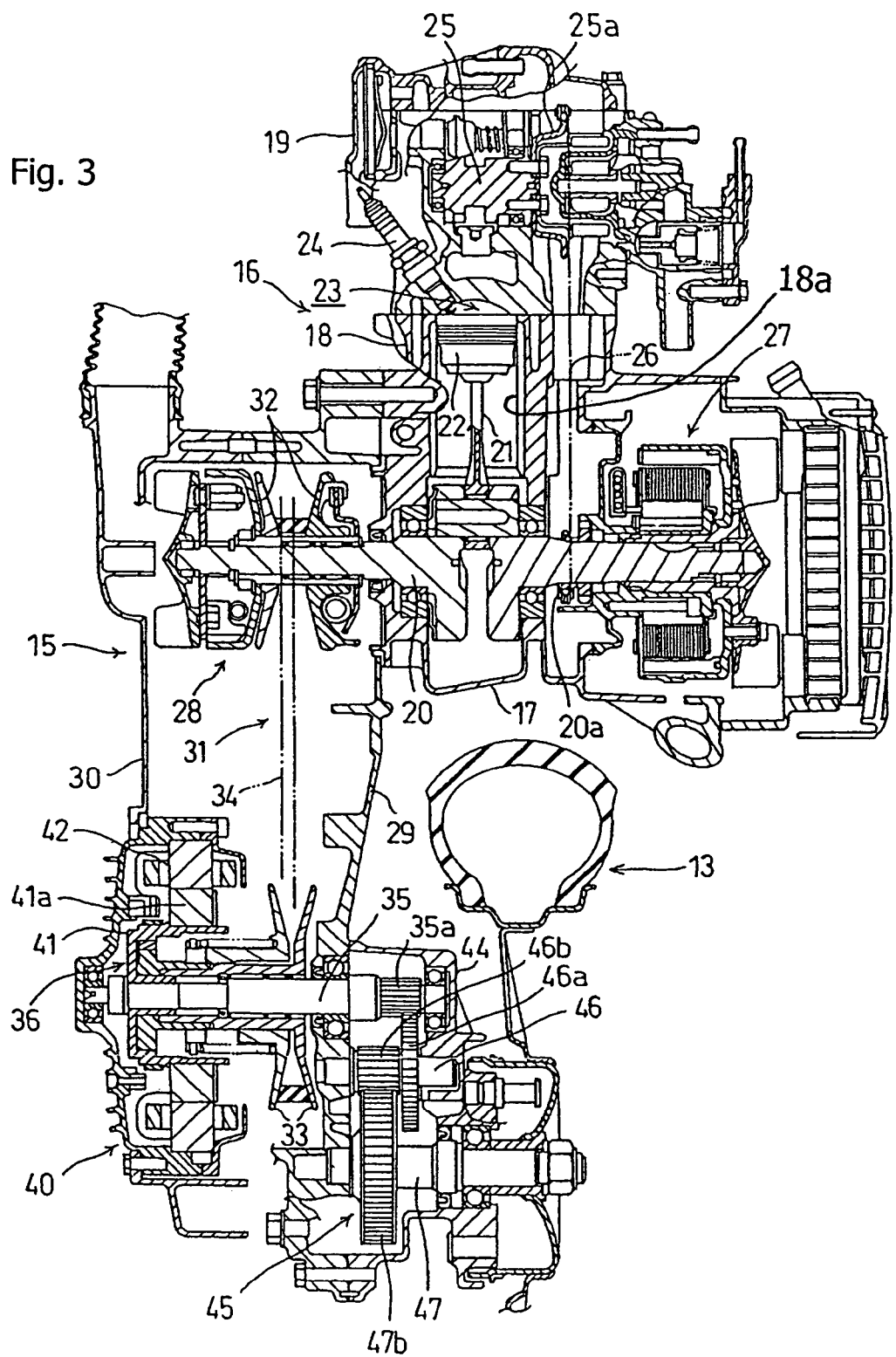
FIG. 3 is a sectional view of a power unit of the motorcycle of FIG. 1, taken along a line III-III of FIG. 1.
Figure 4:
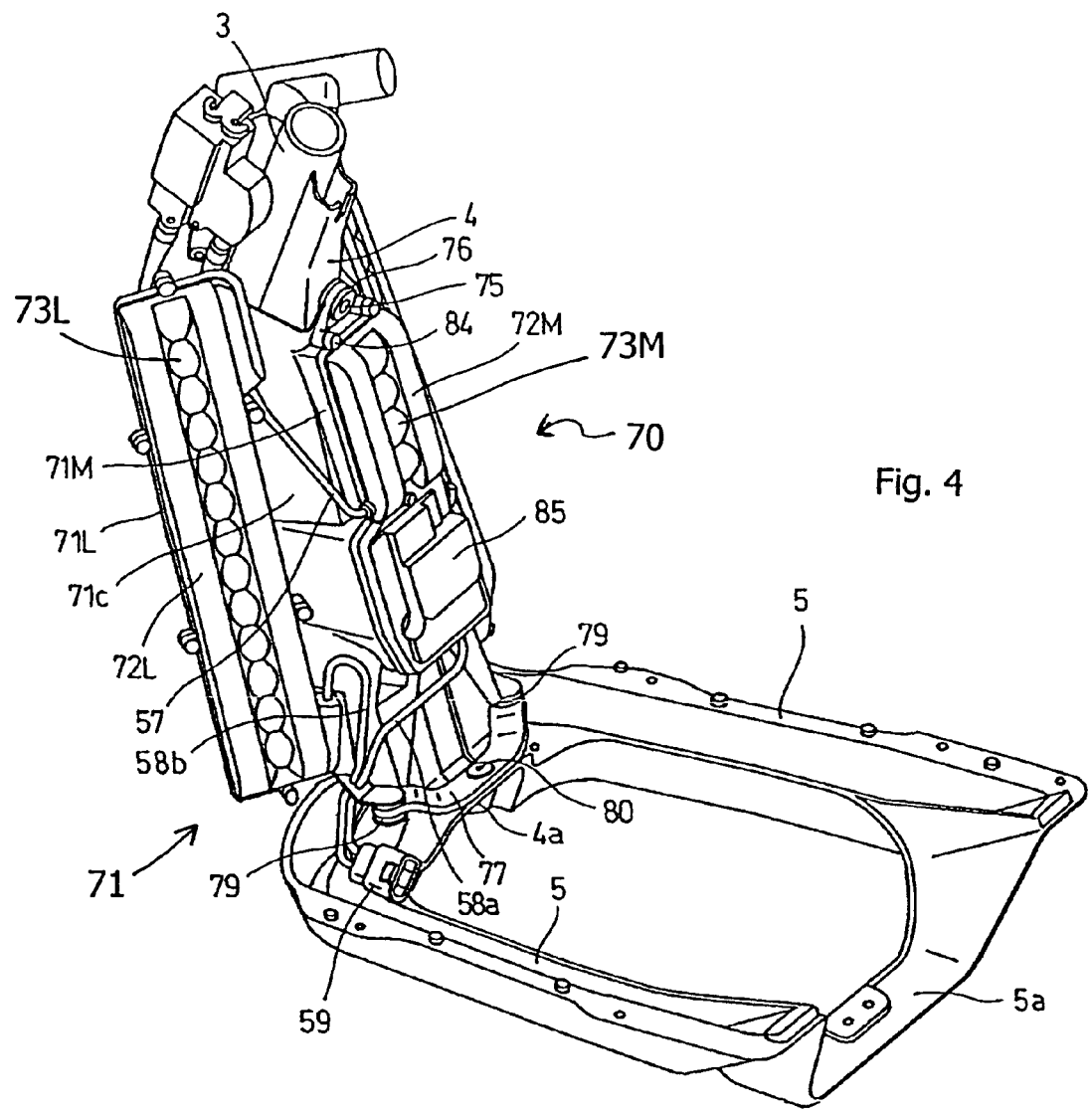
FIG. 4 is a perspective detail view of the isolated body frame of the motorcycle of FIG. 1, showing the battery mounting structure arranged thereon.
Figure 5:
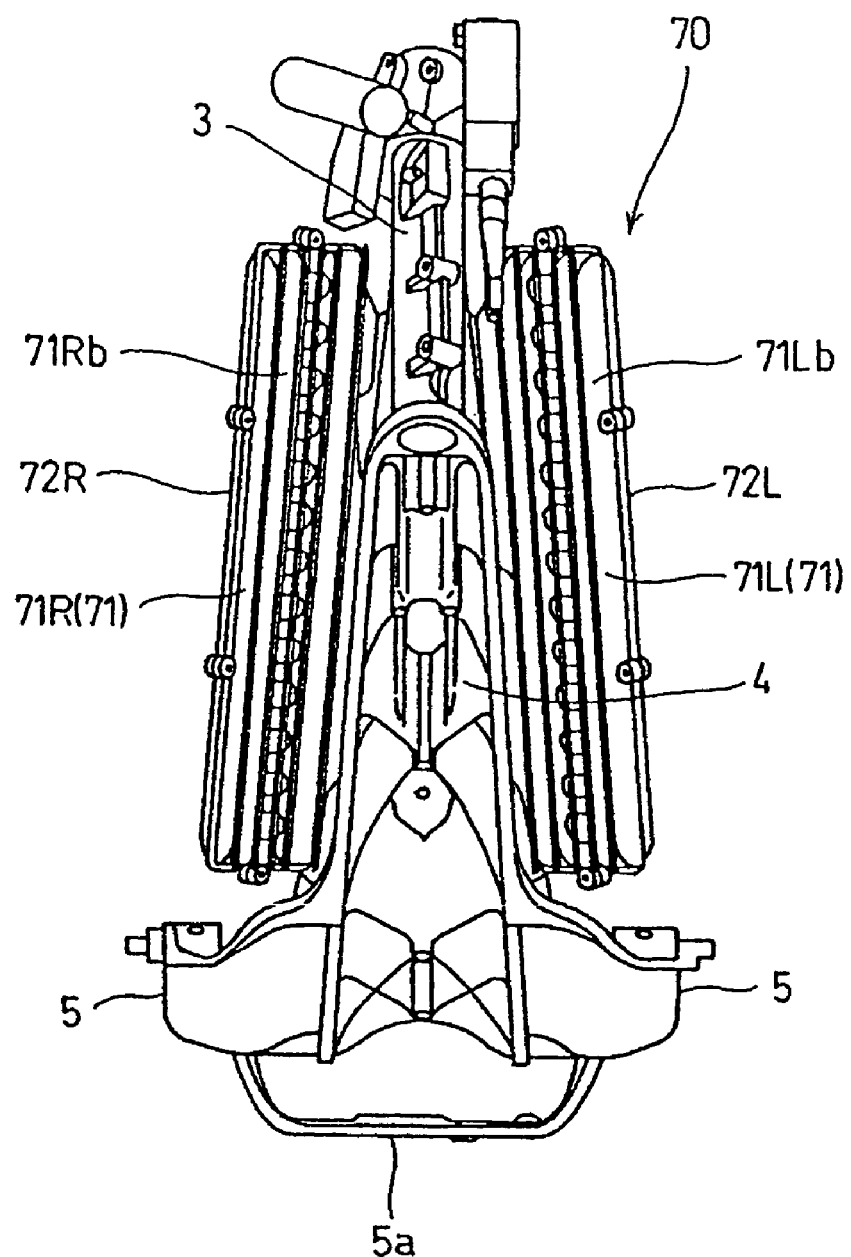
FIG. 5 is an isolated front view of the battery mounting structure of FIG. 4.

The power unit 15 integrally comprises an internal combustion engine 16, a transmission system 30 and a rear wheel 13. As described above, the power unit is a unit swing type such that the rear of the power unit may be vertically rocked. Referring to FIG. 3, the structure of the power unit 15 will be briefly described below.

The power unit 15 includes an internal combustion engine 16, which in turn comprises a cylinder 18a inclined in the forward direction within a cylinder block 18 united with a crankcase 17. A cylinder head 19 is fixed to the front face of the cylinder block 18. A piston 22 is coupled to a crankshaft 20 via a connecting rod 21. The crankshaft 20 is supported by the crankcase 17. The piston 22 reciprocates in the cylinder 18a, and a combustion chamber 23 is formed between the top face of the piston 22 in the cylinder 18a and the cylinder head 19.

A valve (not shown), for controlling the intake and the exhaust of air-fuel mixture into/from the combustion chamber 23, and an ignition plug 24 are arranged in the cylinder head 19. A camshaft 25, for opening and closing the valve, is supported by the cylinder head, and the camshaft 25 is revolved by a cam chain 26 laid on respective sprockets 25a, 20a between the camshaft and the crankshaft 20.

An ACG starter motor 27 is provided on the right side in a direction of the body width of the crankshaft 20. A clutch 28 and a drive pulley 32 of a continuously variable transmission 31 are provided on the left side in the direction of the body width. The front of a transmission case 29 is bonded to the left side of the crankcase 17. The transmission case extends rearward, and a transmission cover 30 covers an opening on the left side of the transmission case 29.

A driven shaft 35 is supported horizontally in the lateral direction between the longitudinal transmission case 29 and the transmission cover 30. At the back of the crankshaft 20, an endless V-belt 34 is laid between a driven pulley 33, supported by the driven shaft 35 so that the driven pulley can be turned, and the drive pulley 32, thereby forming the continuously variable transmission 31.

A one-way clutch 36 is inserted between the drive pulley 33 and the driven shaft 35, and an outer clutch, integrated with the driven shaft 35 of the one-way clutch 36, forms an inner rotor 41 of a drive motor 40. The drive motor 40 is provided with an outer stator 42 supported by the transmission case 30 around a magnet 41a of the inner rotor 41.

A speed reducing gear mechanism 45 is provided along the rear right side of the transmission case 29 so that the speed reducing gear mechanism is covered with a gear cover 44. Motive power is transmitted from the drive shaft 35 to the rear wheel 13 via the speed reducing gear mechanism 45. That is, the drive shaft 35 piercing the transmission case 29 rightward, an intermediate shaft 46 and a rear shaft 47 supporting the rear wheel 18, are arranged mutually in parallel in the gear cover 44. A first pair of speed reducing gears 35a, 46a are provided between the driven shaft 35 and the intermediate shaft 46, and a second pair of speed reducing gears 46b, 47b are provided between the intermediate shaft 46 and the rear shaft 47. The revolution of the driven shaft 35 is reduced at predetermined speed reducing ratio and is transmitted to the rear wheel 13.

As described above, in the power unit 15, the motive power of the internal combustion engine 16 is transmitted from the crankshaft 20 to the rear wheel 13 via the clutch 28, the continuously variable transmission 31, the one-way clutch 36, the drive shaft 35 and the speed reducing gear mechanism 45. In the meantime, the motive power of the drive motor 40 is transmitted from its inner rotor 41 to the rear wheel 13 via the drive shaft 35 and the speed reducing gear mechanism 45.

The drive motor 40 not only assists the output of the internal combustion engine 16 as a motor, but also functions as a motor-generator for converting the revolution of the driven shaft 35 to electric energy.

An air cleaner 50 is attached above the transmission case 29 of the swing unit-type power unit 15 described above. A housing box 51 is supported by the pair of right and left rear frame members 6 of the body frame 2, and is arranged over the internal combustion engine 16 in the power unit 15. A fuel tank 52 is suspended from the intermediate frame 5 forming a rectangle together with the cross member 5a. A battery mounting structure 70 (FIGS. 4-9) is supported by the front frame member 4 of the body frame 2.

As for the front of the vehicle body, a front cover 60 covers the front of the head pipe 3, and a leg shield 61 covers the rear of the head pipe 3. The rear of the battery mounting structure 70 is supported by the front frame member 4. As for the rear of the body, a rear cover 62 is provided in a state in which the rear cover covers the periphery of the housing box 51, footrest space is formed between the leg shield 61 and the rear cover 62, and a step floor 63 covers the fuel tank 52 suspended from the intermediate frame 5. An opening on the upper side of the housing box 51, located inside the rear cover 62, is closed by a seat 64. The opening is exposed when the seat 64 is lifted.

A drive motor driver 53 is built in a flat box, and is fixed to the left side of the rear cover 62. An ACG motor driver 54 (FIG. 2), also built in a flat box, is fixed to the right side of the rear cover 62.

The battery mounting structure 70 is supported by the front frame member 4 of the body frame 2. Groups or clusters of nickel-metal hydride batteries 73M, 73L, 73R are fitted into respective central, left and right fitting concave portions of a battery case 71, and battery covers 72M, 72L, 72R cover respective exposed parts. Each battery group or cluster 73M, 73L, 73R constitutes an individual battery unit. The battery case 71 is fixed to the front frame member 4. Each individual battery of a given cluster is substantially cylindrical in shape, and is arranged with other batteries to form a columnar group, in which each battery is touched by, or proximate to an adjacent battery.

Figure 6:
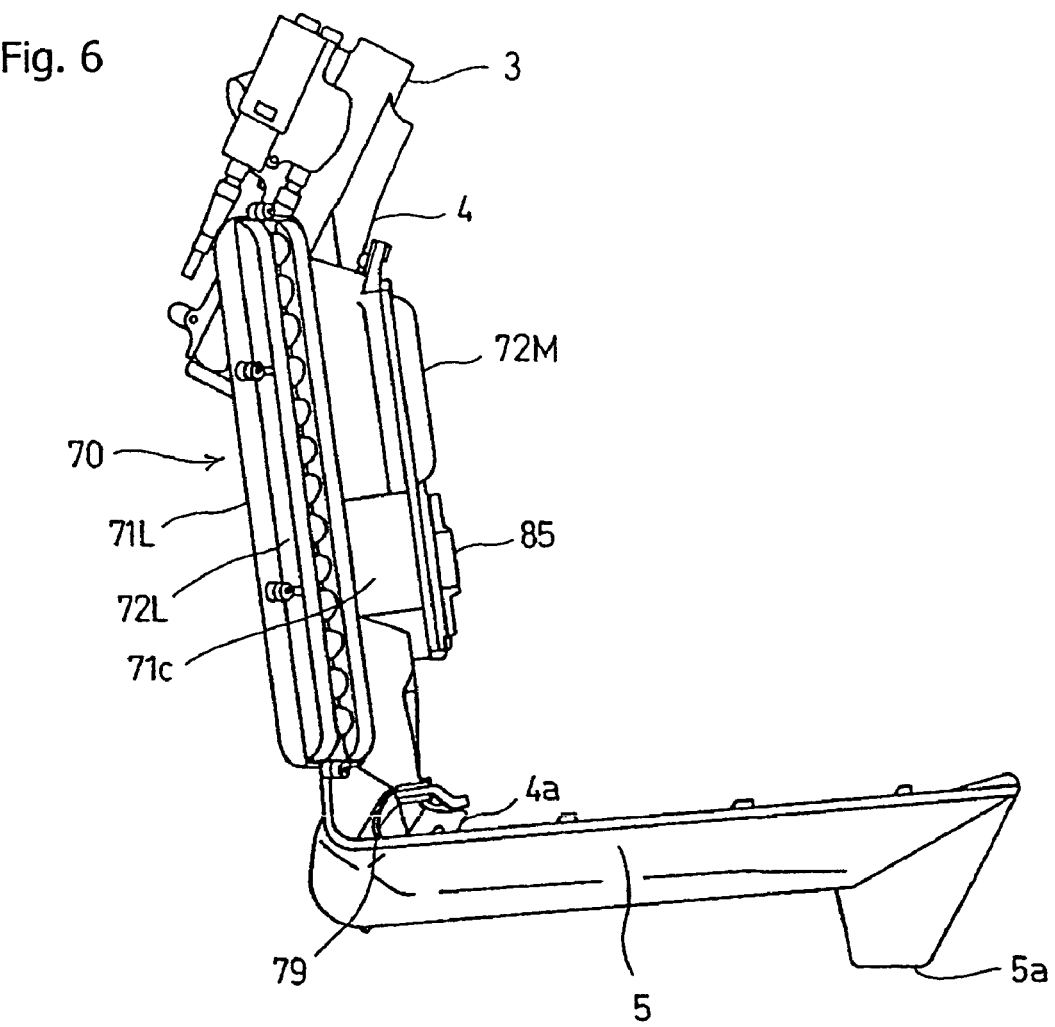
FIG. 6 is a side view of the structure of FIG. 5.
Figure 7:
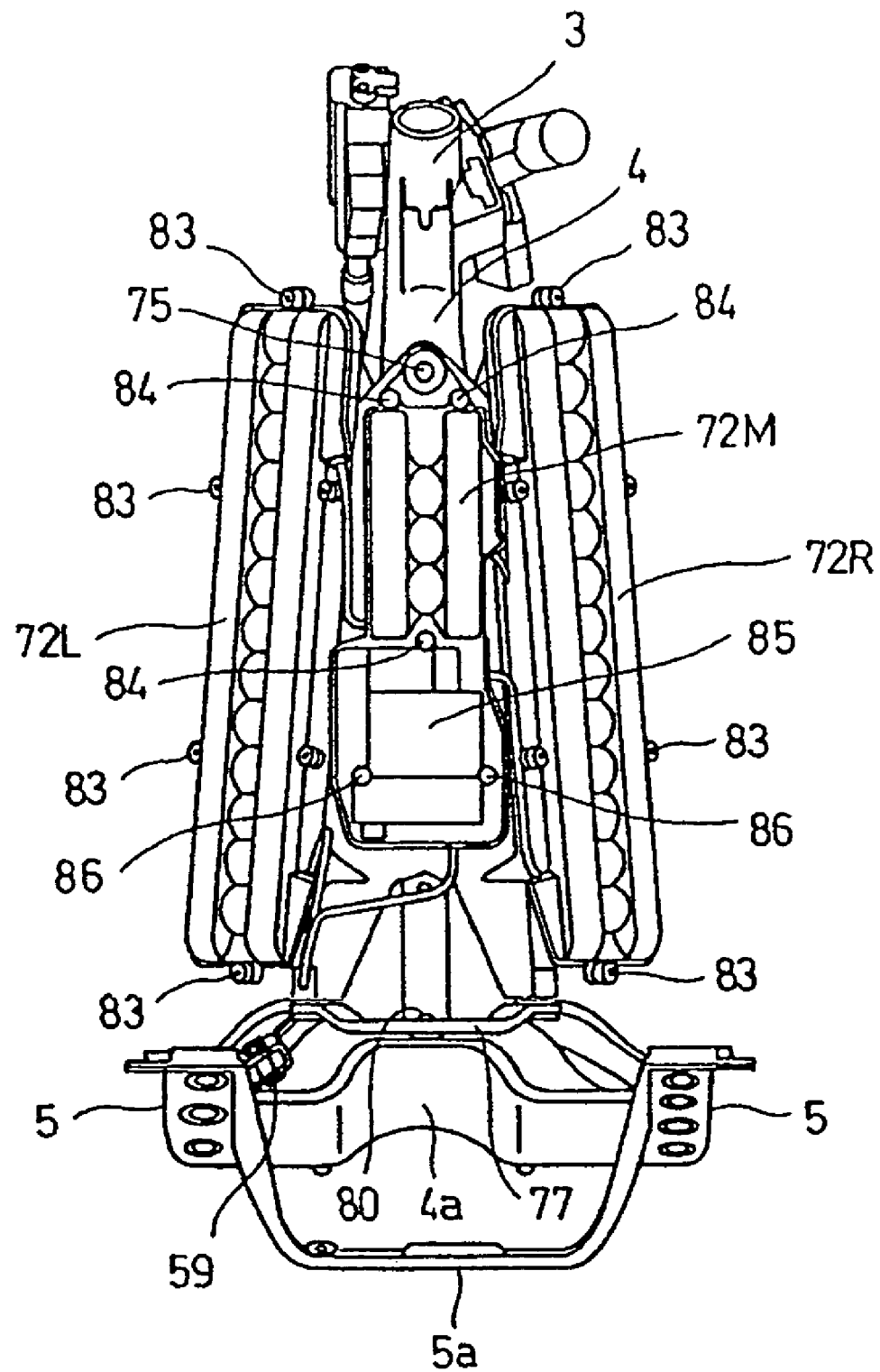
FIG. 7 is a rear side view of the battery mounting structure of FIGS. 4-5.
Figure 10:
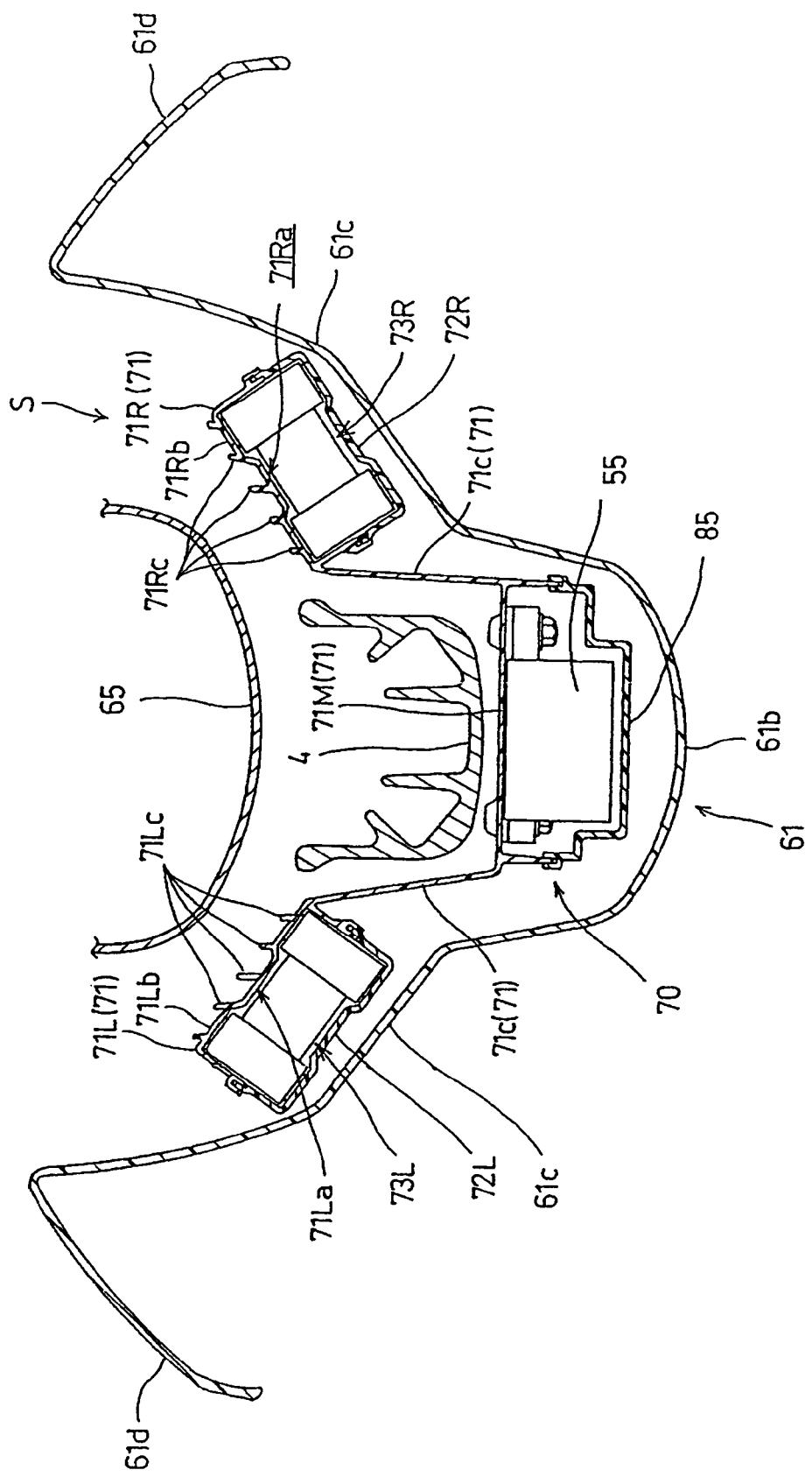
FIG. 10 is a horizontal sectional view of the battery mounting structure, the front fender, and the leg shield of the first embodiment, taken across section line X-X in FIG. 1.

The battery case 71 includes a central case part 71M that vertically extends along the back surface of the front frame member 4. The cross section of central case part 71M is substantially U-shaped as shown in FIG. 10. The battery case includes left and right coupling parts 71c, 71c (FIGS. 6, 10) extending along the left and right sides of the front frame member 4. The left and right coupling parts 71c, 71c are formed as a result of forward curving of the left and right edges of the central case part 71M, so that the central case part 71M is generally U shaped in section. The battery case also includes a left case part 71L and a right case part 71R extending diagonally forward from the respective edges of the left and right coupling parts 71c, 71c. Since the left case part 71L and the right case part 71R are substantially in parallel with the inclined front frame member 4, they are inclined forward to some extent as shown in FIG. 6.

Figure 8:
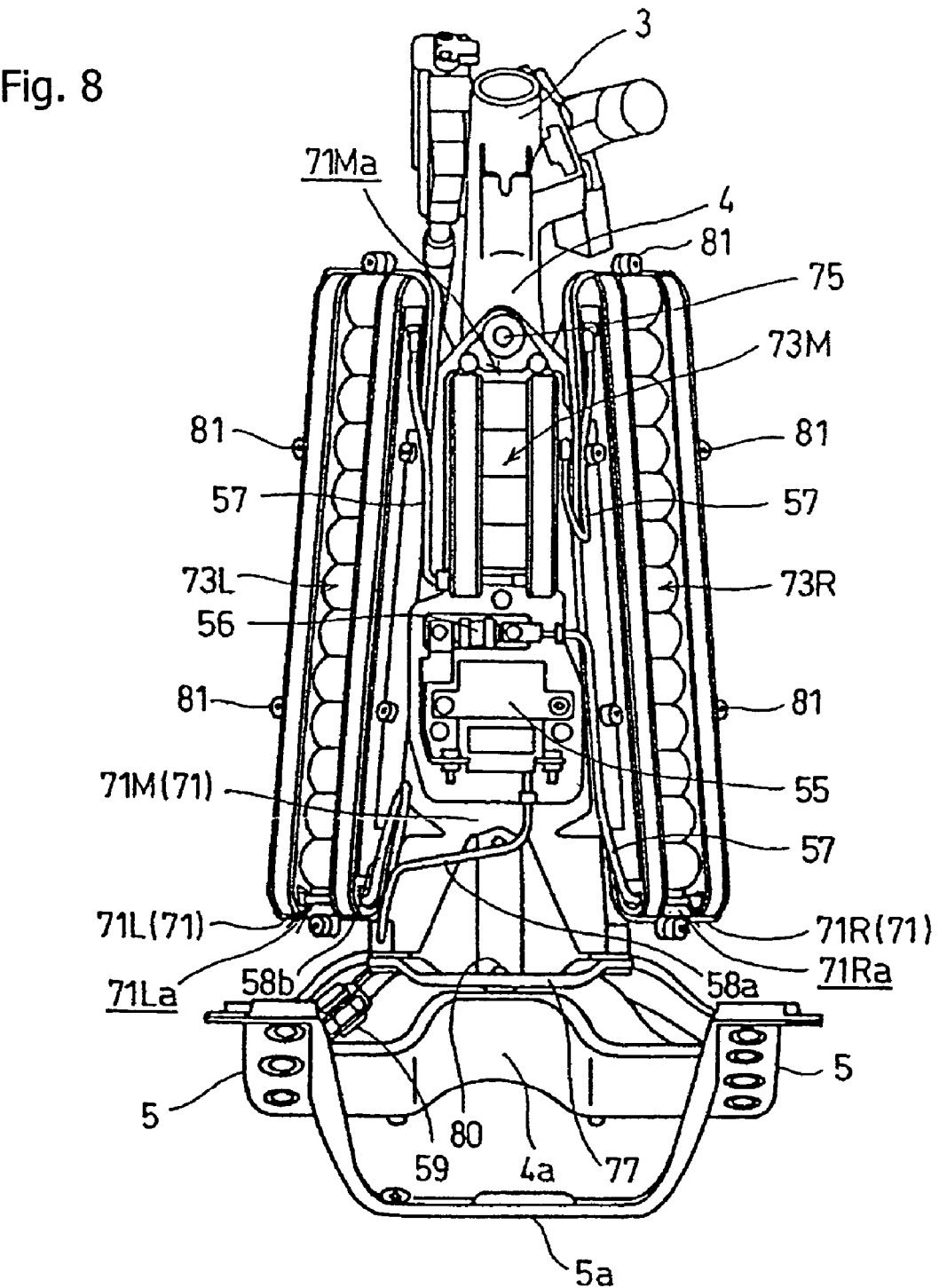
FIG. 8 is a front view showing the battery mounting structure from which a battery cover and others are detached.

As shown in FIG. 8, a medial fitting concave scalloped portion 71Ma is formed in an upper half of the central case part 71M. The central group of batteries 73M is fitted into the medial fitting concave scalloped portion 71Ma from a rear direction. Left and right fitting concave scalloped portions 71La, 71Ra are formed in the left case part 71L and the right case part 71R, respectively, with each extending in a substantially vertical direction. The left group of batteries 73L and the right group of batteries 73R are fitted therein from a diagonally rear direction.

Figure 9:
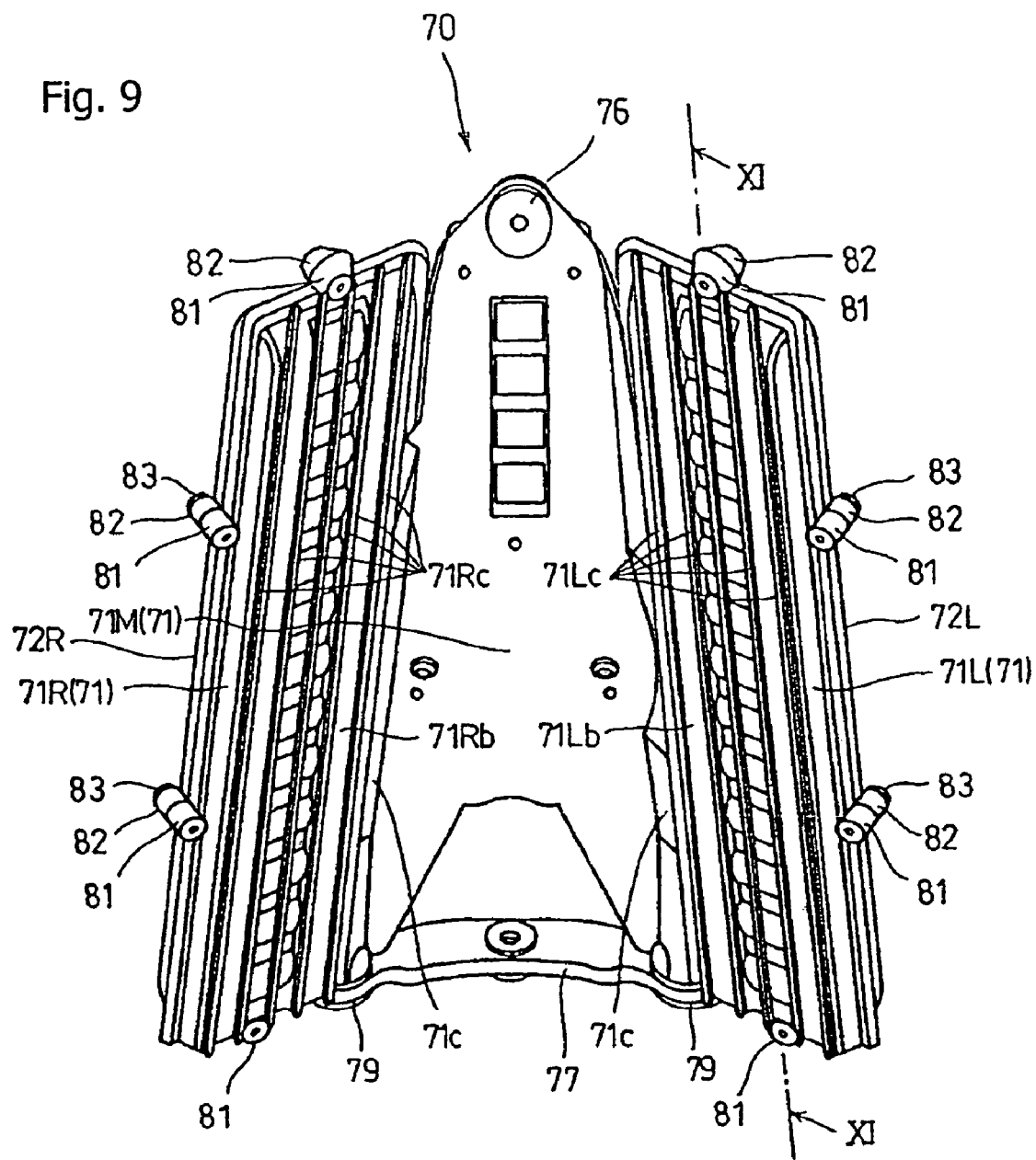
FIG. 9 is a front view showing the battery mounting structure, and specifically the elongate cooling fins extending from the top to the bottom of the cooling faces of the respective left and right battery case parts.

As seen best in FIG. 9, the width of the central case part 71M, on the lower side thereof adjacent to coupling 77, is wider than the width thereof on the upper side adjacent to the head pipe 3. Therefore, the respective lower parts of the left case part 71L and the right case part 71R, laterally extending from the central case part 71M via the coupling parts 71c, 71c, are spread laterally outwardly and divergently when they are viewed from the front.

The tapered upper end of the central case part 71M is fastened to the front frame member 4 via a rubber elastic body 76 and a bolt 75. In the meantime, the lower end of the central case part 71M is forked providing protrusions at the lower end, and both protrusions are fitted into and fitted to grommets 79, 79 fitted into circular holes at the left and right ends of a coupling stay 77. The center of the coupling stay 77 is fastened to a branched part 4a in a lower part of the front frame member 4, which in turn is connected to the left and right intermediate frame members 5, 5 by a bolt 80.

That is, the upper end of the central case part 71M of the battery case 71 is fastened to the upper side of the front frame member 4, and the lower end of the central case part 71M of the battery case 71 is fastened to the lower branched part 4a of the front frame member 4 via the coupling stay 77.

Plural mounting bosses 81, each corresponding to a female tapped hole, are formed in the marginal portion of each fitting concave portion 71La, 71Ra of the left case part 71L and the right case part 71R.

Figure 11:
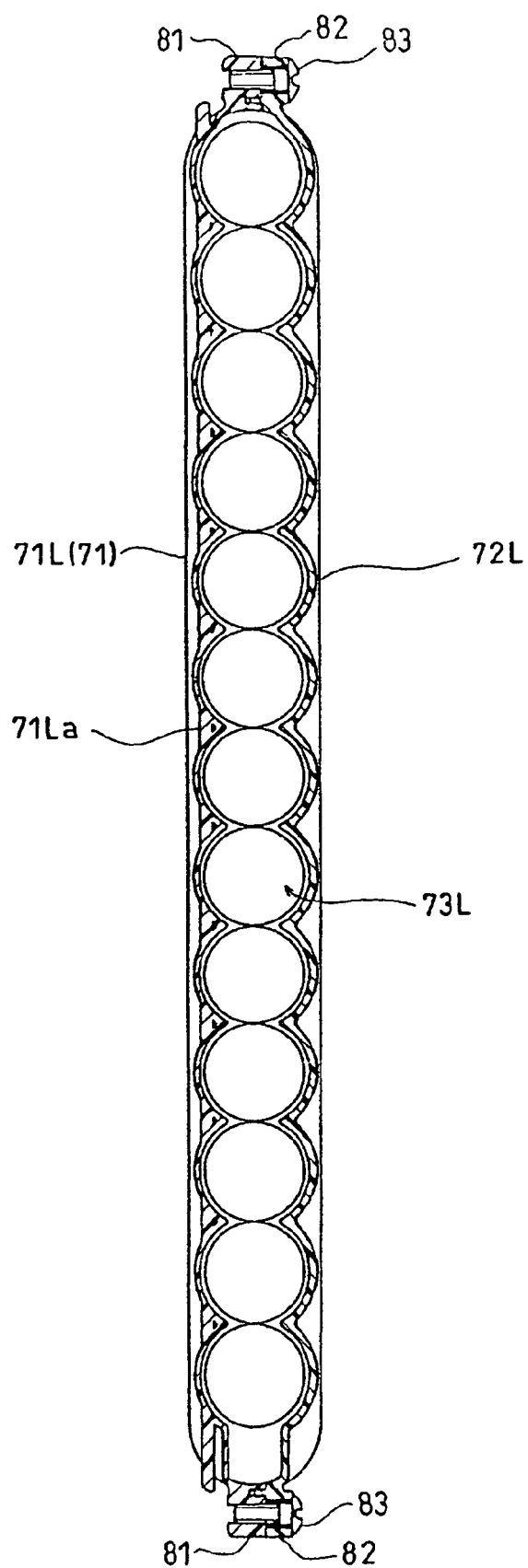
FIG. 11 is a sectional view of the left side battery case, taken along a line XI-XI in FIG. 9.

A left battery cover 72L and a right battery cover 72R are respectively superimposed on the left case part 71L and the right case part 71R, and house therein the left group of batteries 73L and the right group of batteries 73R (see FIG. 11). The left battery cover 72L and a right battery cover 72R are each a long rectangle in which a concave portion corresponding to each fitting concave portion 71La, 71Ra is formed Mounting bosses 82, where each mounting hole is formed, are formed in respective marginal parts of the left battery cover 72L and the right battery cover 72R and correspond to the mounting bosses 81 of the left case part 71L and the right case part 71R. The left battery cover 72L and the right battery cover 72R can be fastened to the left case part 71L and the right case part 71R of the battery case 71 by inserting a clamp screw 83 into the hole of the mounting boss 82 and screwing it into the female tapped hole of the mounting boss 81 after superimposing the left battery cover 72L and the right battery cover 72R on the left case part 71L and the right case part 71R.

As shown in FIG. 11, the bottom surface of the fitting concave portion 71La of the left case part 71L is contoured to have a wavy form comprising a series of semicircular depressions which accommodate the circumferential face of each cylindrical battery. Similarly, the bottom surface of the corresponding concave portion of the left battery cover 72L is also contoured to have a wavy form comprising a series of semicircular depressions which accommodate the circumferential face of each cylindrical battery.

Therefore, each battery of the left group of batteries 73L housed between the left case part 71L and the left battery cover 72L has large area for conducting incoming heat radiation from the left case part 71L or the left battery cover 72L. Thus, battery heat is easily transmitted, and heat generated in the battery is easily radiated via the left case part 71L and the left battery cover 72L. The right case part 71R and the right battery cover 72R also have the same structure and function.

Each of five cooling fins 71Lc, 71Rc protrude from respective cooling faces 71Lb, 71Rb. Each cooling fin 71Lc, 71Rc is vertically elongated so as to extend between respective top and bottom edges of the cooling faces 71Lb, 71Rb. Each cooling fin 71Lc, 71Rc is directed in the forward direction of the vehicle, so as to protrude at an angle from the respective cooling faces 71Lb, 71Rb of the left case part 71L and the right case part 71R (see FIGS. 9) In other word, as shown in FIG. 10, the cooling fins 71Lc, 71Rc protrude straight forward so as to be at an angle with the cooling faces 71Lb, 71Rb.

As shown in FIG. 8, an upper half of the central case part 72M of the battery case 72 includes the fitting concave portion 71Ma into which the central group of batteries 73M is fitted. The lower portion of the central case part 72M of the battery case 72 supports a relay unit 55 and a fuse for a power source 56.

The groups of batteries 73M, 73L, 73R, the fuse for the power source 56 and the relay unit 55 are connected in series via a cable 57. A cord on the plus side 58a extending from the relay unit 55, and a cord on the minus side 58b extending from the left group of batteries 73L, are connected by a coupler 59.

The central group of batteries 73M, fitted into the fitting concave portion 71Ma of the central case part 72M of the battery case 72, is covered with the central battery cover 72M. The circumference of the central case part 72M is fastened by clamp screws 84. The relay unit 55 and the fuse for the power source 56 are covered with a power circuit cover 85, and the power circuit cover is fastened by clamp screws 86.

The leg shield 61, provided in front of the footrest space, is formed by an upper cover 61a that covers the head pipe 3 together with the front cover 60 from the front and the rear. The leg shield 61 also includes a central cover on the downside 61b that continues from the upper cover 61a and covers the back of the battery mounting structure 70 supported by the front frame member 4. Inside leg shield parts 61c, 61c extended diagonally forward from the central cover on the downside 61b, so that the left and the right portions of the battery mounting structure 70 are covered. Outside leg shield parts 61d, 61d are curved diagonally backward at the front edges of the inside leg shield parts 61c, 61c, and extend symmetrically laterally of the vehicle (see FIGS. 1 and 10).

A front fender 65 extends forward from a center position between the inside leg shield parts 61c, 61c, which extend laterally of the leg shield 61. The front fender 65 is integrated with the front fork 8 so that the front fender covers the front wheel 9.

Therefore, in view of the positional relation of the battery mounting structure 70 with respect to the leg shield 61 and the front fender 65, as shown in FIG. 10, the battery mounting structure 70 is arranged together with the front frame member 4 within the open space S between the leg shield 61, extending laterally and diagonally forward, and the front fender 6, located centrally and in front of the front frame member 4.

The space between the leg shield 61 and the front fender 65 is a circular arc-shaped space S. The left and the right ends of the arc-shaped space S are open forwardly when viewed in a cross section (shown in FIG. 10). The front frame member 4 is located in the center of the circular arc-shaped space S. The central case part 71M, the central group of batteries 73M and the central battery cover 72M are located at the back of the arc-shaped space S. The left case part 71L, the left group of batteries 73L and the left battery cover 72L are located opposite to the left side opening, and the right case part 71R, the right group of batteries 73R and the right battery cover 72R are located opposite to the right side opening.

Figure 2:
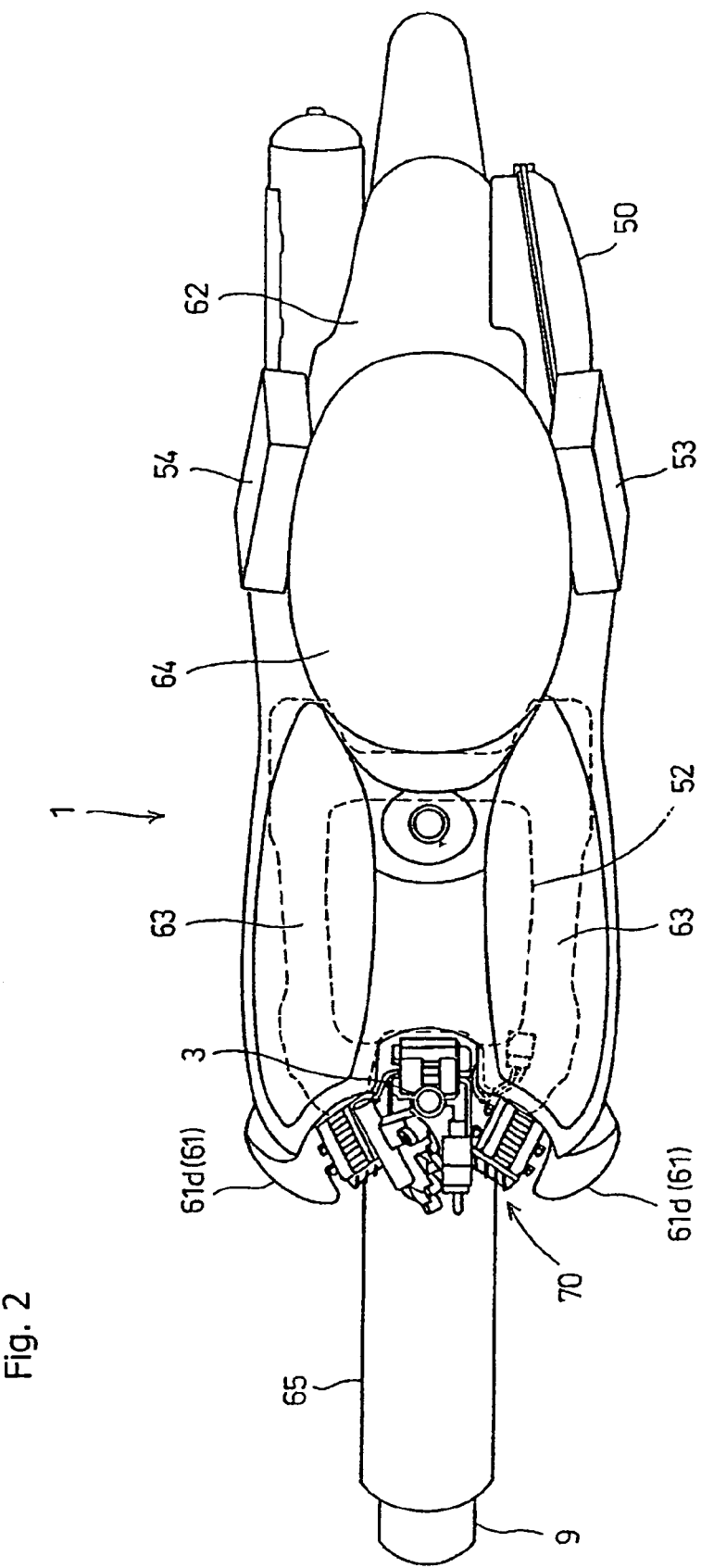
FIG. 2 is a top plan view of the motorcycle of FIG. 1, showing the positional relationship between the battery mounting structure and the head pipe, step floor, and front fender.

Therefore, as shown in FIGS. 10 and 2, the cooling faces 71Lb, 71Rb of the left case part 71L and the right case part 71R in the battery mounting structure 70 are open in the forward direction of the vehicle, and are directly exposed to running wind. That is, the orientation of the cooling faces 71Lb, 71Rb of the left case part 71L and the right case part 71R, in cooperation with the angled cooling fins 71Lc, 71Rc are oriented to obtain maximum benefit of the flow of the running wind.

Because the power consumption of the groups of batteries 73M, 73L, 73R is great when power is supplied to the drive motor 40 for driving the rear wheel 13, the calorific value of the batteries 73M, 73L, and 73R is also great. However, cooling efficiency is greatly enhanced by directly exposing the cooling faces 71Lb, 71Rb of the left case part 71L and the right case part 71R to collected running wind between the inside leg shield parts 61c, 61c of the leg shield 61 in which running wind is collected.

Since the cooling fins 71Lc, 71Rc are vertically directed and protrude from the cooling faces 71Lb, 71Rb which are partly inclined forward, running wind that directly hits on the cooling faces 71Lb, 71Rb is guided by the cooling fins 71Lc, 71Rc. As the running wind smoothly flows downward along the cooling faces 71Lb, 71Rb robbing the heat, cooling efficiency is even more enhanced.

Running wind enters from the left and right side openings of the circular arc-shaped space S between the leg shield 61 and the front fender 65 and enters the central inside of the circular arc-shaped space S. Portions of the running wind that do not hit on the cooling faces 71Lb, 71Rb reach the central case part 71M and the central battery cover 72M and flow downward, so that the central group of batteries 73M is also cooled.

Since in the battery mounting structure 70, the left group of batteries 73L and the right group of batteries 73R are arranged with the front frame member 4 in the center and the central group of batteries 73M is arranged at the back of the front frame member 4 along the front frame member 4, the efficiency of space for arranging the groups of batteries is enhanced, an interval between each group of batteries is suitably maintained, and the effect of heat between the groups of batteries is reduced.

Battery capacity is secured by using plural groups of batteries 73M, 73L, 73R.

Since each lower part of the left case part 71L and the right case part 71R spreads laterally outward relative to the upper part when it is viewed from the front, that is, since the left group of batteries 73L and the right group of batteries 73R are arranged such that the interval between respective lower parts is widened when the groups of batteries are viewed from the front, the footrest space is easily secured behind the leg shield 61.

Next, referring to FIGS. 12 and 13, a second embodiment of the invention will be described.

Figure 12:
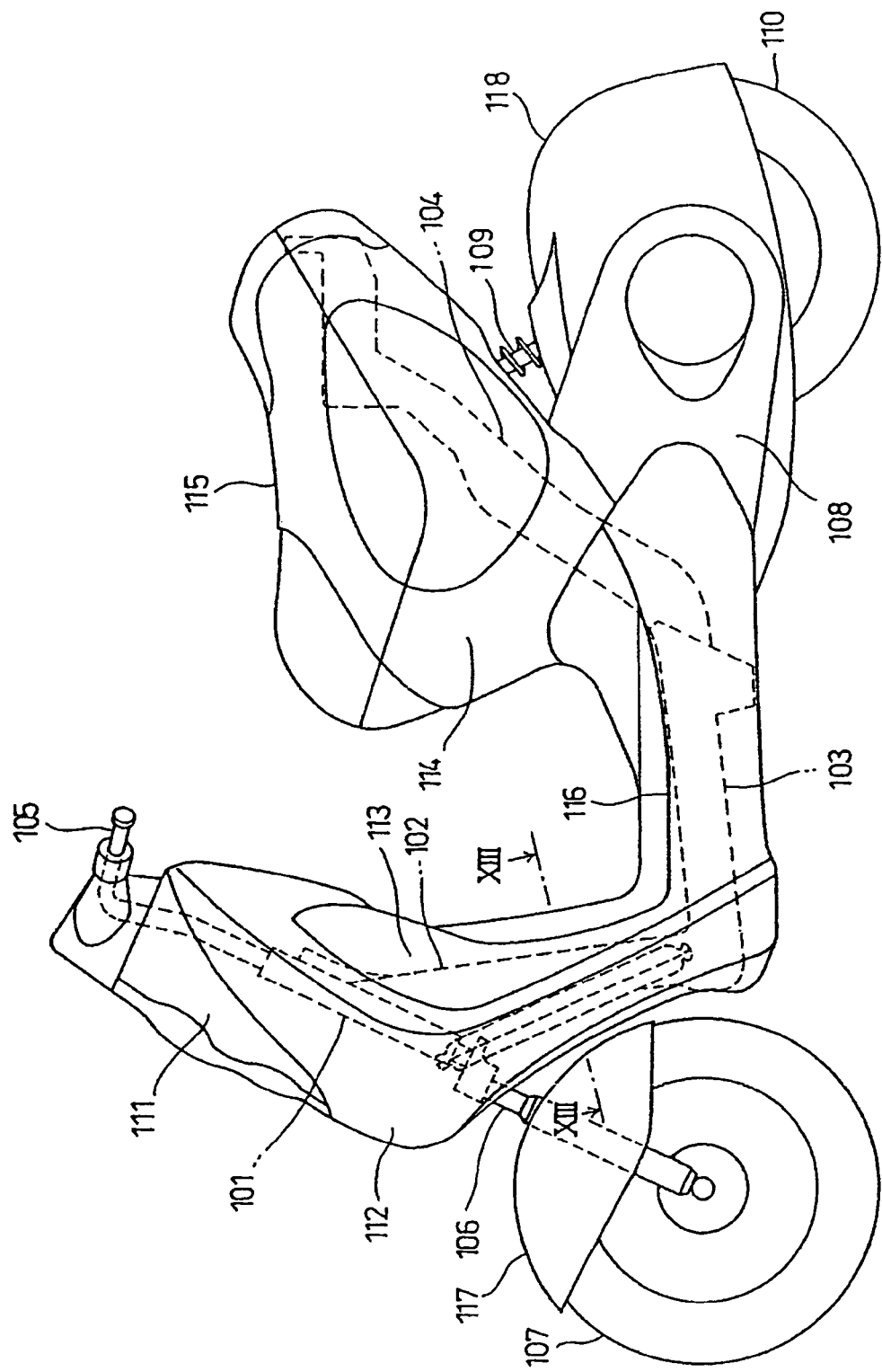
FIG. 12 is a side view showing an scooter-type electric motorcycle which incorporates a second embodiment of the battery mounting structure of the present invention.

FIG. 12 is a side view of a scooter-type electric motorcycle 100 which is an electric vehicle equivalent of the second embodiment.

The scooter-type electric motorcycle 100 has basically the same structure as that of the scooter-type electric motorcycle 1 of the first embodiment, though they are different in appearance and have a slightly different body frame structure. The body frame of the electric motorcycle 100 includes a front frame 102 extending diagonally downward from a head pipe 101 toward the rear of the body, and a pair of intermediate frames 103 which curve backward after they laterally branch from the lower end of front frame 102, and then extend substantially horizontally. The body frame also includes a pair of right and left rear frames 104, each front end of which is coupled to each rear end of the intermediate frames 103, and which extend backward and diagonally upward.

A handlebar 105 is rotatably supported by the head pipe 101 so that the handlebar 105 can be turned. A front fork 106, integrated with the handlebar 105, extends below the head pipe 101. A front wheel 107 is supported by the lower end of the front fork 106, and a front fender 117 covers the front wheel 107.

The electric motorcycle includes a power unit 108, the front of which is linked with the center of the rear frame. The power unit 108 is mounted to the rear frame such that the rear can be vertically rocked, and is provided with a drive motor. A rear wheel 110 is supported by the rear end of the power unit 108. A rear shock absorber is inserted between the rear wheel 110 and the rear of the rear frame 104, and a rear fender 118 covers the rear wheel 110.

In the front of the body, a steering shaft, supported by the head pipe 101, is covered with a front cover 111. A leg shield 112 covers the head pipe 101 and the front of the front frame 102 below the front cover, and an inner cover 113 covers the rear of the front frame 102.

In the rear of the body, a rear cover 114 is provided so that the outer circumference of a housing box is covered. An upper opening of the housing box, disposed inside the rear cover 114, is closed by a seat 115. The seat 115 is lifted to expose the upper opening of the housing box. Footrest space is formed between the inner cover 113 and the rear cover 114, and a step floor 116 resides on the intermediate frames 103.

Figure 13:
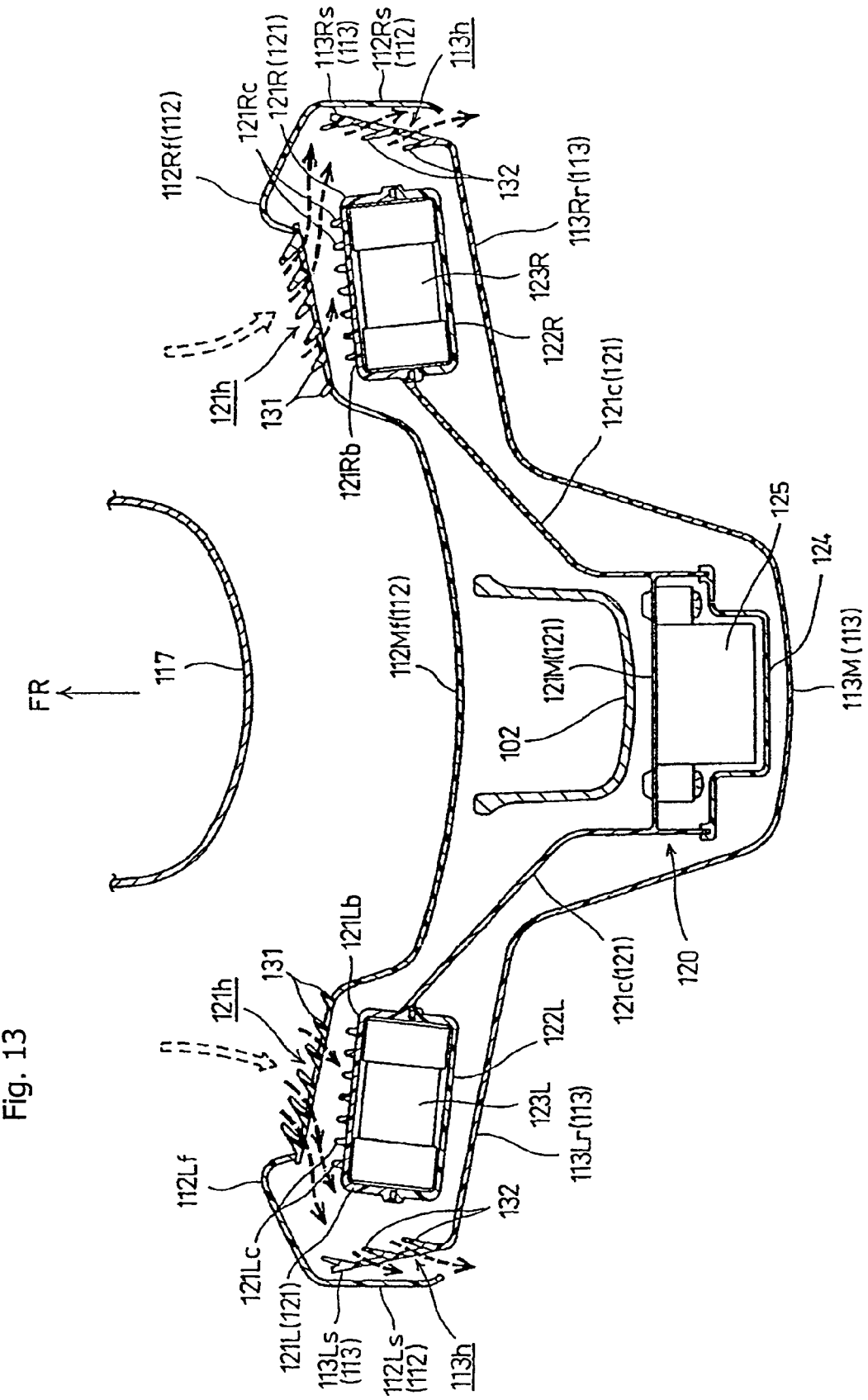
FIG. 13 is a sectional view of the battery mounting structure, the front fender, and the leg shield of the second embodiment, taken along a line XIII-XIII in FIG. 12.

As shown in FIG. 13, a battery mounting structure 120 is supported by the front frame 102, and includes a central case part 121M in which a battery case 121 extends vertically along the rear surface of the front frame 102. The battery mounting structure includes the left and right coupling parts 121c, 121c which extend diagonally outward and forward from the lateral sides of the central case part 121M. That is, the left and right coupling parts 121c, 121c extend diagonally leftward and rightward, respectively, along the left and right sides of the front frame 102 by a forward, and then outward, curving of the left and right edges of the central case part 121M. The battery mounting structure also includes a left case part 121L and a right case part 121R which extend laterally outwardly leftward and rightward, from the respective edges of the left and right coupling parts 121c, 121c in a manner similar to that of the battery mounting structure 70 of the first embodiment.

A left group of batteries 123L and a right group of batteries 123R are fitted into each fitting concave portion open at the back of the left case part 121L and the right case part 121R, respectively vertically long, and battery covers 122L, 122R cover each exposed part.

Respective plural cooling fins 121Lc, 121Rc protrude forward from cooling faces 121Lb, 121Rb, which are the forward directed faces of the left case part 121L and the right case part 121R. The cooling fins 121Lc, 121Rc extend vertically between the upper and lower edges of the cooling faces 121Lb, 121Rb.

A control mechanism, such as a relay unit 125, is inserted into the central case part 121M and is covered with a central cover 124.

The forward facing portions of the battery mounting structure 120 and the front frame 102 are covered with the leg shield 112, and the rearward facing portions are covered with the inner cover 113.

As shown in FIG. 13, the leg shield 112 is formed by a central front wall part 112Mf extending leftward and right ward along the, front frame 102 in front of the front frame 102. A left front wall part 112Lf and a right front wall part 112Rf further extend outside leftward and rightward after slightly forward curving the left and the right of the central front wall part 112Mf. In addition, a left side wall part 112Ls and a right side wall part 112Rs of the leg shield 112 are formed by backward curving the left and right ends of the left front wall part 112Lf and the right front wall part 112Rf.

Cooling wind intakes 121h, 121h, which are vertically elongate and open forward, are formed in each inside part of the left front wall part 112Lf and the right front wall part 112Rf. A louver 131, 131 is provided for each cooling wind intake 121h, 121h. The plural blades of the louver 131 are vertically elongate to accommodate the shape of the cooling wind intakes 121h, 121h, and protrude diagonally forward and toward the center of the vehicle body.

In the meantime, the inner cover 113 covers the rear of the battery mounting structure 120. The inner cover 113 is formed by a central wall part 113M. The cross section of inner cover 113 is U-shaped and extends the left side and the right side so as to cover from the rear the relay unit 125 and other components provided in the center of the battery mounting structure 120. The inner cover 113 includes a left rear wall part 113Lr and a right rear wall part 113Rr formed by extending the left and right ends of the central wall part 113M laterally outwardly leftward and rightward, and a left side wall part 113Ls and a right side wall part 113Rs formed by curving the left and right ends of the left rear wall part 113Lr and the right rear wall part 113Rr forward and slightly diagonally outwardly.

The left side wall part 113Ls and the right side wall part 113Rs are laterally overlapped by the left side wall part 112Ls and the right side wall part 112Rs of the leg shield 112 such these portions are generally confronting and a small gap is formed therebetween. When the vehicle is viewed from the side, the view of the left side wall part 113Ls and the right side wall part 113Rs is obstructed by the respective left side wall part 112Ls and the right side wall part 112Rs of the leg shield 112.

Cooling wind exhaust ports 113h, 113h, which are vertically elongate and open to the side of the vehicle, are formed in the left side wall part 113Ls and the right side wall part 113Rs. A louver 132, 132 is provided for each cooling wind exhaust port 113h, 113h. Respective plural blades of the louvers 132, 132, provided on the left side wall part 113Ls and the right side wall part 113Rs, which extend forward and slightly diagonally outside, protrude along the vertical direction and substantially in the forward direction of the vehicle.

As described above, the front and the rear of the battery mounting structure 120 are covered with the leg shield 112 and the inner cover 113, as shown in FIG. 13. The left side case part 121L and the right side case part 121R for fitting the left group of batteries 123L and the right group of batteries 123R are covered by the left front wall part 112Lf and the right front wall part 112Rf of the leg shield 112 which is a front cover and the left rear wall part 113Lr and the right rear wall part 113Rr of the inner cover 113 which is a rear cover in a longitudinal direction of the body. Each outside of the left side case part 121L and the right side case part 121R is doubly covered by the left side wall part 112Ls and the right side wall part 112Rs of the leg shield 112 and the left side wall part 113Ls and the right side wall part 113Rs of the inner cover 113.

The cooling wind intakes 121h, 121h are formed on the left front wall part 112Lf and the right front wall part 112Rf of the leg shield 112 in front of the left side case part 121L and the right side case part 121R. The louvers 131, 131 are provided on each of the cooling wind intakes 121h, 121h. The cooling wind exhaust ports 113h, 113h are formed on the left side wall part 113Ls and the right side wall part 113Rs of the inner cover 113 laterally outside with respect to the left side case part 121L and the right side case part 121R. The louvers 132, 132 are provided on each of the cooling wind exhaust ports 113h, 113h.

Therefore, running wind from the front directly hits on the cooling faces 121Lb, 121Rb of the left side case part 121L and the right side case part 121R via the louvers 131, 131 from the cooling wind intakes 121h, 121h of the left front wall part 112Lf and the right front wall part 112Rf of the leg shield 112.

As for the louvers 131, 131, since plural blades protrude diagonally forward toward the center of the vehicle body, cooling wind is directed diagonally outside as shown by broken arrows in FIG. 13, flows outside on the left and on the right along the cooling faces 121Lb, 121Rb of the left side case part 121L and the right side case part 121R. The cooling wind is further guided by the left and right end curved parts of the leg shield 112, is directed toward the left side wall part 113Ls and the right side wall part 113Rs of the inner cover 113, turning backward along the left side case part 121L and the right side case part 121R, is guided by the plural blades of the louvers 132, 132 which protrude forward, and is smoothly exhausted backward from the cooling wind exhaust ports 113h, 113h (see the broken arrows shown in FIG. 13).

Since the cooling fins 121Lc, 121Rc are vertically directed and protrude from the cooling faces 121Lb, 121Rb of the left side case part 121L and the right side case part 121R, cooling wind is guided downward along the cooling fins 121Lc, 121Rc on each surface of the cooling faces 121Lb, 121Rb and is exhausted downward.

As described above, since running wind is guided by the louvers 131, 131 formed on the cooling wind intakes 121h, 121h of the leg shield 112, so as to be taken in, and since and the left side case part 121L and the right side case part 121R, into which the left group of batteries 123L and the right group of batteries 123R are fitted, are directly exposed to the smooth flow of cooling wind, which is then guided and exhausted by the louvers 132, 132 from the cooling wind exhaust ports 113h, 113h of the inner cover 113, the cooling efficiency of the left group of batteries 123L and the right group of batteries 123R is enhanced.

Since the cooling fins 121Lc, 121Rc protrude from the cooling faces 121Lb, 121Rb of the left case part 121L and the right case part 121R, cooling wind is guided along the cooling fins 121Lc, 121Rc, so as to smoothly flow downward on the cooling faces 121Lb, 121Rb, and remove heat therefrom. Thus, the cooling efficiency of the battery mounting structure 120 is even more enhanced.

Since the louvers 131, 131 are provided on the cooling wind intakes 121h, 121h of the leg shield 112, they substantially prevent the splashes of mud during operation, flying gravel and other objects from invading from the cooling wind intakes 121h, 121h. Even if flying gravel and other objects enter therethrough, they enter after they hit on the blades of the louvers 131, 131, and thus are prevented from directly colliding with the groups of batteries 123L, 123R. Therefore, the groups of batteries 123L, 123R are protected, and the durability is enhanced.

Since the louvers 132, 132 are provided to the cooling wind exhaust ports 113h, 113h of the inner cover 113, and since the left side wall part 112Ls and the right side wall part 112Rs of the leg shield 112 cover the respective outsides thereof, a stone, mud and other objects are possibly prevented from invading from the cooling wind exhaust ports 113h, 113h.

Since the battery mounting structure 120 is covered with the leg shield 112 and the inner cover 113 and is hidden, its appearance is desirable. Since the respective outsides of the louvers 132, 132 of the cooling wind exhaust ports 113h, 113h of the inner cover 113 are covered by the left side wall part 112Ls and the right side wall part 112Rs of the leg shield 112, the louvers 132, 132 are invisible from the outside, and thus the appearance is further enhanced.

Since running wind is taken in from the cooling wind intakes 121h, 121h of the leg shield 112, smoothly flows and is exhausted from the cooling wind exhaust ports 113h, 113h of the inner cover 113, air resistance is small and specific fuel consumption is correspondingly reduced.

In the above-mentioned embodiment, the invention is applied to the scooter-type electric motorcycle. However, the invention can be also applied to an electric three-wheeled vehicle and an electric four-wheeled vehicle when the vehicle is a vehicle provided with a body frame in which a front frame extends diagonally downward from a head pipe to the rear of the body.

While a working example of the present invention has been described above, the present invention is not limited to the working example described above, but various design alterations may be carried out without departing from the present invention as set forth in the claims.

What is claimed is:

1. In an electric vehicle of the type having a body frame including a head pipe and a front frame member which extends diagonally downward from the head pipe toward the rear of the electric vehicle, the electric vehicle including an electric motor as a driving source, and at least one battery unit for supplying power to the motor, wherein the battery unit has a radiating face for radiating heat outwardly therefrom; the improvement comprising a battery mounting structure comprising a battery case for supportively holding said battery unit on said body frame;

wherein the battery mounting structure secures the battery unit to the front frame member of the body frame in such a configuration that the radiating face of the battery unit is operatively exposed to running wind during operation of the vehicle, wherein the battery mounting structure further comprises a front cover for covering the battery unit from the front of the vehicle, and a rear cover for covering the battery unit from the rear of the vehicle, wherein a cooling wind intake is formed in a front wall of the front cover that faces the forward direction of the vehicle, wherein a cooling wind exhaust port is formed in the rear cover, and wherein the cooling wind exhaust port is formed on a side wall of the rear cover so as to substantially face a lateral side of the vehicle, the cooling wind exhaust port disposed at a location which is overlapped with a side wall of the front cover, and wherein the exhaust port is located behind the side wall of the front cover when viewed from the side of the vehicle.

2. The battery mounting structure for an electric vehicle according to claim 1, wherein radiating fins are provided on the radiating face of the battery unit.

3. The battery mounting structure for an electric vehicle according to claim 1, wherein plural battery units attached to the front frame member of the body frame are spaced about the front frame member; and wherein an interval between adjacent battery units is wider adjacent to a lower part of the battery mounting structure than adjacent to an upper part of the battery mounting structure.

4. The battery mounting structure for an electric vehicle according to claim 1, wherein said at least one battery unit comprises:

a first battery unit disposed on the left side of the vehicle, a second battery unit disposed on the right side of the vehicle with the front frame member of the body frame therebetween; and a third battery unit arranged along the front frame member.

5. The battery mounting structure for an electric vehicle according to claim 1, further comprising a louver provided on the front cover at the cooling wind intake.

6. The battery mounting structure for an electric vehicle according to claim 1, further comprising a louver provided on the rear cover at the cooling wind exhaust port.

7. The battery mounting structure for an electric vehicle according to claim 1, wherein the radiating face of the battery unit is adapted to be operatively exposed to running wind during movement of the vehicle, and is oriented to substantially face the direction of flow of running wind.

8. The battery mounting structure for an electric vehicle according to claim 1, wherein three battery units are attached to the front frame member of the body frame, the three battery units being arranged so that a first battery unit is situated along a rear face of the front frame member, a second battery unit is situated laterally outward of the left side of the front frame member, and a third battery unit is situated laterally outward of the right side of the front frame member, and wherein the three battery units reside within an arc-shaped space between an arcuate rear cover and a front fender.

9. The battery mounting structure for an electric vehicle according to claim 8, wherein a left end and a right end of the arc-shaped space open forwardly to receive the running wind therein.

10. The battery mounting structure for an electric vehicle according to claim 1, wherein radiating fins are provided on the radiating face of the battery unit, the radiating fins comprising elongate protrusions lying generally in parallel with a longitudinal axis of the front frame member and protruding substantially in the forward movement direction of the vehicle.

11. The battery mounting structure for an electric vehicle according to claim 1, wherein the battery unit is covered from the front of the vehicle with a front cover;

a cooling wind intake is formed in a front wall of the front cover that faces the forward direction of the vehicle;

a louver is provided on the cooling wind intake; and radiating fins are provided on the radiating face of the battery unit, wherein the radiating face of the battery unit is oriented to substantially face the cooling wind intake, such that the louver directs running wind toward the radiating fins.

12. A battery mounting structure for an electric vehicle, the electric vehicle comprising:
a body frame including a front frame member which extends diagonally downward from a head pipe toward the rear of the electric vehicle;
an electric motor as a driving source; and
at least one battery unit for supplying power to the motor, wherein the battery unit has a radiating face for radiating heat outwardly therefrom;
the battery unit comprising a grouping of individual batteries arranged to form an elongate body having a plurality of pairs of opposed sides, wherein each side of a first pair of opposed sides has a surface area which is much greater than a surface area of any of the remaining sides of the body other than the first pair, and wherein each side of the first pair of opposed sides comprises a radiating face of the battery unit, and each side of the first pair of opposed sides is oriented so to lie substantially parallel to the front frame member,
wherein the battery mounting structure comprises a battery case which secures the battery unit to the front frame member of the body frame in such configuration that a radiating face of the battery unit is adapted to be operatively exposed to running wind during movement of the vehicle;
wherein the battery unit is covered from the front of the vehicle with a front cover and from the rear of the vehicle with a rear cover; and a cooling wind intake is formed in a front wall of the front cover that faces the forward direction of the vehicle, and a louver is provided on the cooling wind intake; and
wherein a cooling wind exhaust port is formed in a side wall of the rear cover at a location which is overlapped with a side wall of the front cover, the exhaust port located behind the side wall of the front cover when viewed from the side of the vehicle, and wherein a louver is provided on the cooling wind exhaust port.

13. The battery mounting structure for an electric vehicle according to claim 12, wherein the at least one battery unit comprises:
a first battery unit arranged on the left side of the vehicle,
a second battery unit arranged on the right side of the vehicle with the front frame member of the body frame therebetween; and
a third battery unit arranged along the front frame member.

14. The battery mounting structure for an electric vehicle according to claim 12, wherein
radiating fins are provided on a radiating face of the battery unit, the radiating fins comprising elongate protrusions lying generally in parallel with a longitudinal axis of the front frame member and protruding substantially in the forward movement direction of the vehicle.

15. The battery mounting structure for an electric vehicle according to claim 12, wherein
radiating fins are provided on a radiating face of the battery unit, and wherein the radiating fins are oriented to substantially face the cooling wind intake such that the louver directs running wind toward the radiating fins.

16. An electric vehicle, comprising:
a body frame comprising a head pipe and a front frame member which extends diagonally downward from the head pipe toward the rear of the electric vehicle,
an electric motor for use as a driving source,
at least one battery unit for supplying power to the motor, wherein the battery unit has a radiating face for radiating heat outwardly therefrom; and
a battery mounting structure comprising a battery case for supportively holding said battery unit on said body frame;
wherein the battery mounting structure secures the battery unit to the front frame member of the body frame in such a configuration that the radiating face of the battery unit is operatively exposed to running wind during operation of the vehicle,
wherein the battery mounting structure further comprises a front cover for covering the battery unit from the front of the vehicle, and a rear cover for covering the battery unit from the rear of the vehicle,
wherein a cooling wind intake is formed in a front wall of the front cover that faces the forward direction of the vehicle,
wherein a cooling wind exhaust port is formed in the rear cover, and
wherein the cooling wind exhaust port is formed on a side wall of the rear cover so as to substantially face a lateral side of the vehicle, the cooling wind exhaust port disposed at a location which is overlapped with a side wall of the front cover, and wherein the exhaust port is located behind the side wall of the front cover when viewed from the side of the vehicle.

17. The electric vehicle according to claim 16, wherein radiating fins are provided on the radiating face of the battery unit.

18. The electric vehicle according to claim 16, wherein
plural battery units attached to the front frame member of the body frame are spaced about the front frame member; and
an interval between adjacent battery units is wider adjacent to a lower part of the battery mounting structure than adjacent to an upper part of the battery mounting structure.

19. The electric vehicle according to claim 16, wherein said at least one battery unit comprises a first battery unit disposed on the left side of the vehicle, and a second battery unit disposed on the right side of the vehicle with the front frame member of the body frame therebetween; and
a third battery unit arranged along the front frame member.

20. The electric vehicle according to claim 16, further comprising a louver provided on the front cover at the cooling wind intake.

21. A battery mounting structure for an electric vehicle having a body frame including a head pipe and a front frame member which extends diagonally downward from the head pipe toward the rear of the electric vehicle, the electric vehicle including an electric motor as a driving source, and at least one battery unit for supplying power to the motor, wherein the battery unit has a radiating face for radiating heat outwardly therefrom;
said battery mounting structure comprising a battery case for supportively holding said battery unit on said body frame;
wherein the battery mounting structure is adapted to secure the battery unit to the front frame member of the body frame in such a configuration that the radiating face of the battery unit is operatively exposed to running wind during operation of the vehicle;

wherein the battery mounting structure further comprises a front cover for covering the battery unit from the front of the vehicle, and a rear cover for covering the battery unit from the rear of the vehicle;

wherein a cooling wind intake is formed in a front wall of the front cover that faces the forward direction of the vehicle, further comprising a louver provided on the front cover at the cooling wind intake, wherein a cooling wind exhaust port is formed in the rear cover;

and wherein the cooling wind exhaust port is formed on a side wall of the rear cover so as to substantially face a lateral side of the vehicle, the cooling wind exhaust port disposed at a location which is overlapped with a side wall of the front cover, the exhaust port located behind the side wall of the front cover when viewed from the side of the vehicle.

22. The battery mounting structure for an electric vehicle according to claim 14, wherein left and right coupling parts extend diagonally forward leftward and rightward along the left and right side of the front frame; and wherein said battery unit is attached to an edge of said coupling parts.

* * * * *